(12) United States Patent
Zhai et al.

(10) Patent No.: US 10,298,854 B2
(45) Date of Patent: May 21, 2019

(54) HIGH DYNAMIC RANGE VIDEO CAPTURE CONTROL FOR VIDEO TRANSMISSION

(71) Applicant: Apple Inc., Cupertino, CA (US)

(72) Inventors: Jiefu Zhai, San Jose, CA (US); Xiaosong Zhou, Campbell, CA (US); Chris Y. Chung, Sunnyvale, CA (US); Hsi-Jung Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/726,331

(22) Filed: May 29, 2015

(65) Prior Publication Data

US 2015/0350514 A1   Dec. 3, 2015

Related U.S. Application Data

(60) Provisional application No. 62/006,003, filed on May 30, 2014.

(51) Int. Cl.
| | |
|---|---|
| *H04N 5/235* | (2006.01) |
| *H04N 5/232* | (2006.01) |
| *H04N 19/176* | (2014.01) |
| *H04N 19/115* | (2014.01) |
| *H04N 19/154* | (2014.01) |
| *H04N 19/117* | (2014.01) |
| *H04N 19/14* | (2014.01) |
| *H04N 19/156* | (2014.01) |

(52) U.S. Cl.
CPC ......... *H04N 5/2355* (2013.01); *H04N 5/2351* (2013.01); *H04N 5/23219* (2013.01); *H04N 19/115* (2014.11); *H04N 19/154* (2014.11); *H04N 19/176* (2014.11); *H04N 5/2353* (2013.01); *H04N 19/117* (2014.11); *H04N 19/14* (2014.11); *H04N 19/156* (2014.11)

(58) Field of Classification Search
None
See application file for complete search history.

(56) References Cited

U.S. PATENT DOCUMENTS

| | | | |
|---|---|---|---|
| 7,733,380 B1 * | 6/2010 | Cote | H04N 5/23212 348/220.1 |
| 8,446,481 B1 * | 5/2013 | Geiss | H04N 5/2353 348/221.1 |
| 2009/0193137 A1 | 7/2009 | Pawson | |
| 2009/0219387 A1 | 9/2009 | Marman et al. | |
| 2010/0008542 A1 * | 1/2010 | Lee | G06K 9/3241 382/103 |

(Continued)

FOREIGN PATENT DOCUMENTS

WO   2014/099320 A1   6/2013

*Primary Examiner* — Mekonnen D Dagnew
(74) *Attorney, Agent, or Firm* — BakerHostetler

(57) ABSTRACT

Systems and methods are provided for capturing high quality video data, including data having a high dynamic range, for use with conventional encoders and decoders. High dynamic range data is captured using multiple groups of pixels where each group is captured using different exposure times to create groups of pixels. The pixels that are captured at different exposure times may be determined adaptively based on the content of the image, the parameters of the encoding system, or on the available resources within the encoding system. The transition from single exposure to using two different exposure times may be implemented gradually.

37 Claims, 5 Drawing Sheets

(56) References Cited

U.S. PATENT DOCUMENTS

| | | | |
|---|---|---|---|
| 2010/0172404 A1* | 7/2010 | Isnardi | H04N 19/61 375/240.01 |
| 2011/0080956 A1* | 4/2011 | Zhou | H04N 19/61 375/240.24 |
| 2011/0158547 A1* | 6/2011 | Petrescu | G06K 9/00248 382/224 |
| 2011/0211087 A1* | 9/2011 | Mate | H04N 5/232 348/222.1 |
| 2013/0002898 A1* | 1/2013 | Tian | H04N 5/225 348/222.1 |
| 2013/0028088 A1 | 1/2013 | Do et al. | |
| 2015/0271493 A1* | 9/2015 | Okazaki | H04N 5/23206 348/211.11 |

* cited by examiner

100

300

HIGH DYNAMIC RANGE VIDEO CAPTURE CONTROL FOR VIDEO TRANSMISSION

CROSS-REFERENCE TO RELATED APPLICATION

The present application claims the benefit of U.S. provisional application Ser. No. 62/006,003, filed May 30, 2014, entitled, "HIGH DYNAMIC RANGE VIDEO CAPTURE CONTROL FOR VIDEO TRANSMISSION", the disclosure of which is incorporated herein by reference in its entirety.

BACKGROUND

The present invention relates to video capture and coding techniques.

Video distribution systems include a video source and at least one receiving device. The video content may be distributed over a network, such as broadcast television, Over The Top (OTT) delivery, Internet Protocol Television (IPTV), etc., or over fixed media, such as Blu-ray, DVDs, etc. To keep complexity and cost low, video content is typically limited in dynamic range, e.g., 8-10 bit signal representations and 4:2:0 color format.

Recent advances in video capture and display technology, however, have opened the door for the use of more sophisticated content, including content characterized as High Dynamic Range (HDR). High Dynamic Range content is essentially characterized by an increased dynamic range, which is described as the ratio between the largest and smallest possible values that are represented in the signal. For video content, in particular, there is an interest in supporting content that can have values as small as 0.005 nits (cd/m2), where the nit unit is a metric used to measure/specify luminance, up to 10000 nits in the entertainment space, whereas in other academic and scientific spaces lower and higher values are also of interest.

However, although video capture and display technologies may be capable of dealing with video data at a high dynamic range, the encoder and decoder technology may be limited to a certain bit depth. For example, encoder limitations may eliminate much of the value of capturing higher quality video data. Additionally, network bandwidth may limit the amount of data that can efficiently be transmitted between source and receiving devices.

Therefore, the inventors perceived a need in the art for an improved data capture and encoding process capable of handling higher quality content that results in an improved quality of encoded high dynamic range video data compared to conventional encoders.

BRIEF DESCRIPTION OF THE DRAWINGS

The foregoing and other aspects of various embodiments of the present invention will be apparent through examination of the following detailed description thereof, in conjunction with the accompanying drawing figures in which similar reference numbers are used to indicate functionally similar elements.

DETAILED DESCRIPTION

Systems and methods are provided as described herein for capturing high dynamic range video data for use with conventional encoders and decoders. According to an embodiment, high dynamic range data is captured using multiple groups of pixels where each group is captured using different exposure times. Then when those groups are combined, they achieve a higher dynamic range than images captured with a single exposure time.

According to an embodiment, the groups of pixels that are to be captured at different exposure times may be determined adaptively based on the content of the image, the parameters of the encoding system, or on the available resources within the encoding system. For example, pixels in a high brightness region of the image may be grouped together. Increasing exposure time to overexpose certain regions may save bits.

Other groups may include pixels representing an object, such as a face or other foreground image may be grouped together. For such objects, the highest quality pixels captured by the camera may be selected. According to an embodiment, the pixels of these objects may be separated into groups that have different exposure time and then when combined, will achieve a higher dynamic range.

According to an embodiment, groups of pixels captured at different exposure times may be combined using interpolation to smooth the transition between the groups.

According to an embodiment, the transition from single exposure to using two different exposure times, or the transition from two closely spaced exposure times to two widely spaced exposure times for different pixel groups may be implemented gradually. The gradual transition may occur over a predetermined period of time or over a number of frames.

Figure 1:
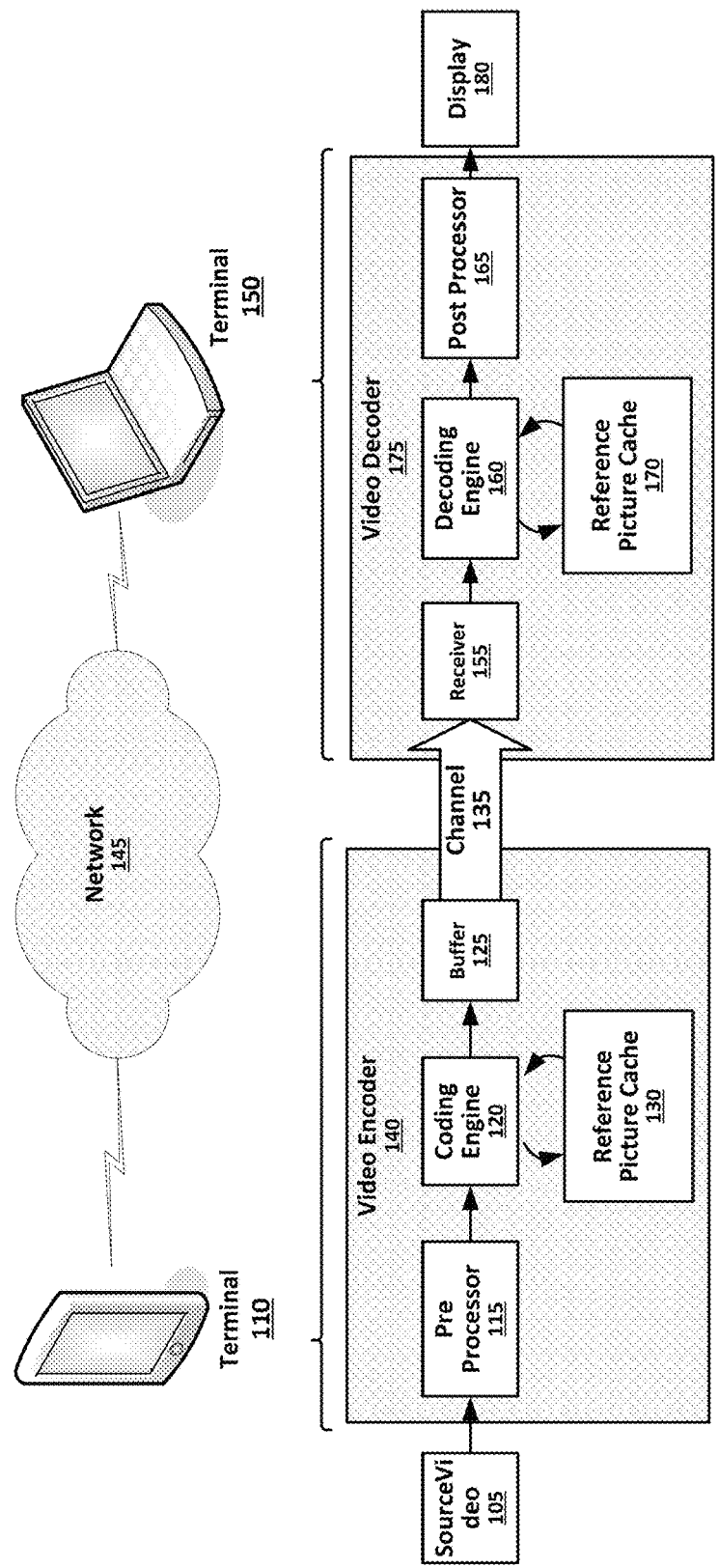
FIG. 1 is a simplified block diagram of a video coder/decoder system 100 according to an embodiment of the present invention.

In video coding systems, an encoder may code a source video sequence into a coded representation that has a smaller bit rate than does the source video and, thereby achieve data compression. A decoder may then invert the coding processes performed by the encoder to retrieve the source video. FIG. 1 is a simplified block diagram of a video coder/decoder system 100 according to an embodiment of the present invention.

A video system may include terminals, 110, 150 that communicate via a network 145. The terminals each may receive video data locally and code the video data for transmission to another terminal via the network. Each terminal may receive the coded video data of the other terminal from the network, decode the coded data and display the recovered video data. Video terminals may include personal computers (both desktop and laptop computers), tablet computers, handheld computing devices, computer servers, television devices, media players and/or dedicated video conferencing equipment.

The encoder system 140 may include a pre-processor 115 that receives a sequence of source video data and performs pre-processing operations that condition the source video 105 for subsequent coding. Video pre-processing may be performed upon source video data to render video coding more efficient including by performing video processing operations on video frames such as de-noising filtering, bilateral filtering or other kinds of processing operations that improve efficiency of coding operations performed by the encoder.

An encoder system 140 may accept an HDR/WCG source video sequence 105, pre-process the source video 105, and may code the processed source video as coded video, which typically has a much lower bit rate than the source video. The encoding engine 120 may select from a variety of coding modes to code the video data, where each different coding mode yields a different level of compression, depending upon the content of the source video 105. Typically, the encoding engine 120 may code the processed source video according to a known protocol such as H.265, HEVC, H.264, MPEG-2 or MPEG-7. The coding engine 120 may code the processed source video according to a predetermined multi-stage coding protocol. Such video coding processes typically involve content prediction, residual computation, coefficient transforms, quantization and entropy coding. For example, common coding engines parse source video frames according to regular arrays of pixel data (e.g., 8×8 or 16×16 blocks), called "pixel blocks" herein, and may code the pixel blocks according to block prediction and calculation of prediction residuals, quantization and entropy coding.

As shown in FIG. 1, the encoder system 140 may receive video data captured from a camera (not shown). Using a sensor, the camera captures the desired image but may also include some background noise in the captured signal. In order to capture content at a high dynamic range, groups of pixels in a captured image may have different integration times, one integration time to capture details in a high brightness background and the other integration time to capture details for the main objects. For example, bright pixels may be part of first group whereas object related pixels form a second group. Other groupings of pixels may also be used. Pixels of the same group will have the same exposure or integration time.

Figure 2:
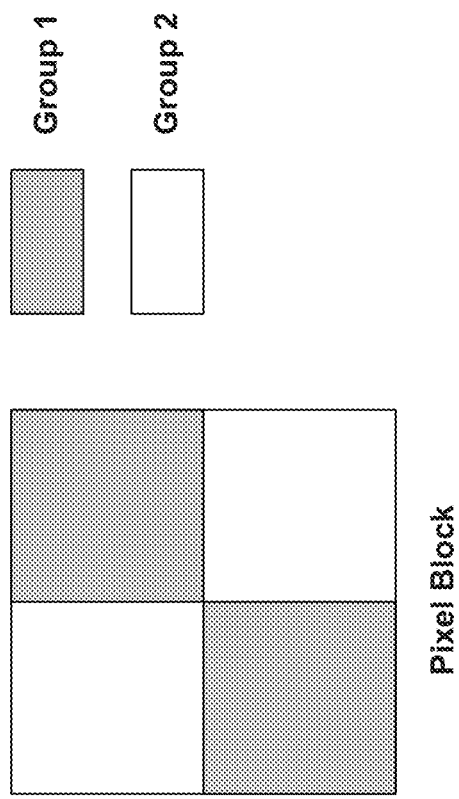
FIG. 2 illustrates an exemplary pixel block with two groups of pixels captured at a camera according to an embodiment of the present invention.

FIG. 2 illustrates an exemplary 4×4 pixel block with two groups of pixels captured at a camera according to an embodiment of the present invention. Group 1 pixels may be captured with a longer exposure time and group 2 pixels may be captured with a shorter exposure time. The capture of multiple groups at different exposure times may be done in parallel depending on the capabilities of the camera. By combining the information from two groups of pixels, a high dynamic range video frame can be obtained.

Groups of captured pixels may be combined in a number of ways. For example, according to an embodiment, the captured groups may be combined by identifying the important objects or regions of interest in the video data and selecting the highest quality pixels available for those regions. Then the less significant regions may use a lower quality group of pixels. Or, according to an embodiment, the captured groups may be fused together using interpolation to smooth the transitions between groups.

Returning to FIG. 1, a decoding engine (not shown) within the video encoder 140 may generate reconstructed video data for use as a basis for predictive coding techniques performed by the encoding engine 120. The reference frame cache 130 may store frame data that may represent sources of prediction for later-received frames input to the video coding system. Both the encoder system 110 and decoder system 120 may store reference frames. A buffer 125 may store the coded data and combine the coded data and any related metadata into a common bit stream to be delivered by the channel 135.

The encoder system 140 may output the coded video data to the channel 135, which may be a storage device, such as an optical, magnetic or electrical storage device, or a communication channel formed by computer network or a communication network for example either a wired or wireless network. A channel 135 may deliver the coded video data output from the coding engine to the decoder system 175. A decoder system 175 may retrieve the coded video data from the channel 135, invert the coding operations performed by the encoder system 140 and output decoded video data to an associated display device 180.

As shown the video communication system supports video coding and decoding in one direction only. For bidirectional communication, an encoder and decoder may each be implemented at each terminal 110, 150, such that each terminal may receive source video data locally and code the video data for transmission to the other terminal via the network 140. Each terminal may receive the coded video data of the other terminal from the network, decode the coded data and display video data recovered therefrom.

As shown in FIG. 1, a decoder system 175 may include a receiver 155 to receive the coded channel data and separate the coded video data from any received metadata, a decoding engine 160 to receive coded video data and invert coding processes performed by the encoding engine 120, a postprocessor 165, and a display pipeline 180 that represents further processing stages (buffering, etc.) to output the final decoded video sequence to a display device.

According to an embodiment, parameters and metadata may be transmitted in logical channels established by the governing protocol for out-of-band data. As one example, used by the H.264 protocol, the decoder may receive noise parameters in a supplemental enhancement information (SEI) channel specified by H.264. In such an embodiment, the receiver 155 represents processes to separate the parameters and/or metadata from a logical channel corresponding to the SEI channel. However, when the present invention is to be used with protocols that do not specify such out-of-band channels, the receiver 155 may separate the parameters and/or metadata from the encoded video data by utilizing a logical channel within the input channel 135.

The decoding engine 122 may parse the received coded video data to recover the original source video data, for example by decompressing the frames of a received video sequence by inverting coding operations performed by the encoder 140. The decoding engine 160 may access a reference picture cache 170 to store frame data that may represent source blocks and sources of prediction for later-received frames input to the decoder system 175.

Figure 3:
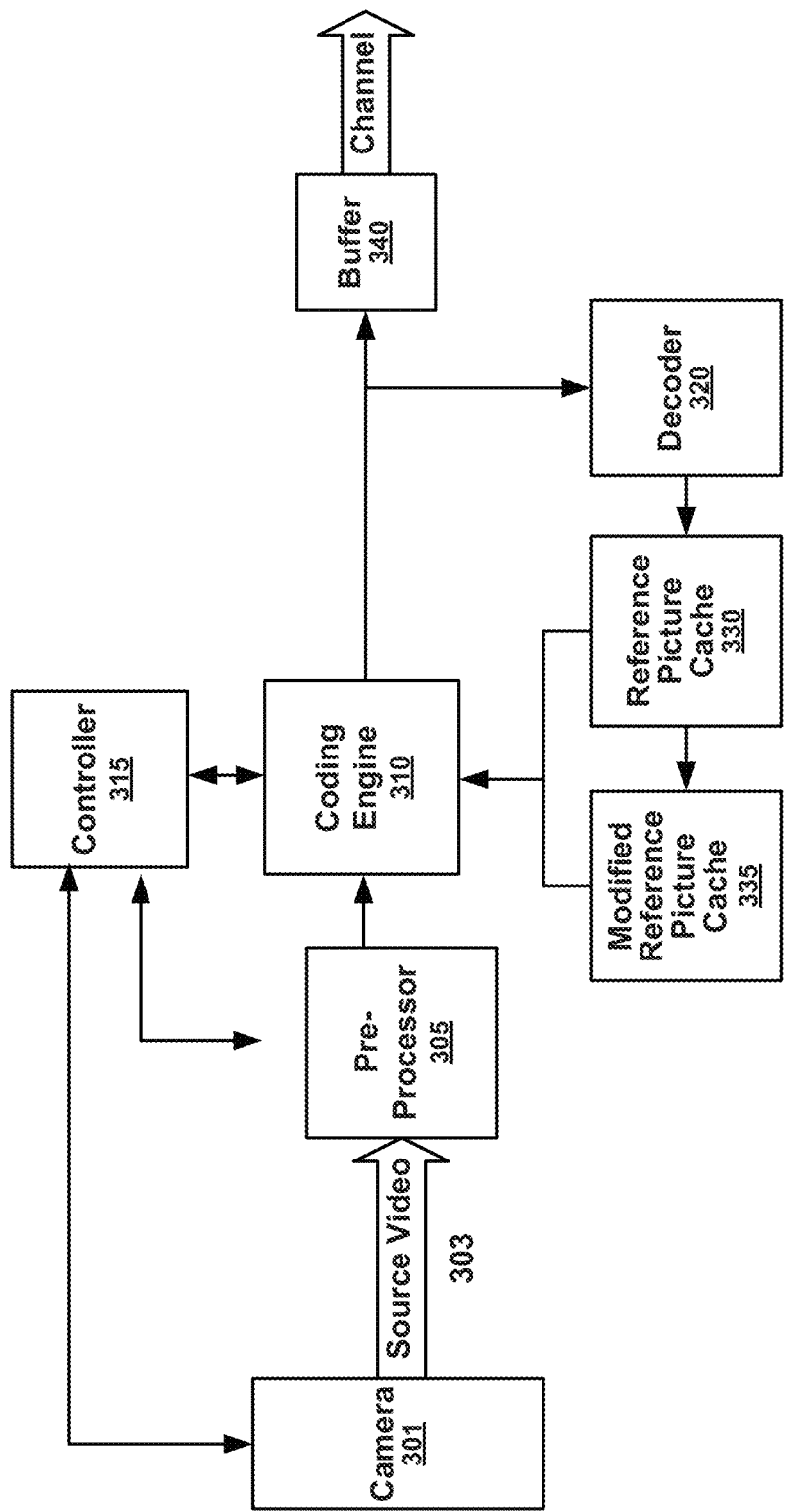
FIG. 3 is a simplified block diagram that illustrates an encoder system according to an embodiment of the present invention.

FIG. 3 is a simplified block diagram that illustrates an encoder system 300 according to an embodiment of the present invention. As shown in FIG. 3, and encoder system 300 may include a camera 301 that captures image or video data. As previously noted, a camera may include an image sensor (not shown) to capture an optical image and interprets the image as an analog signal. An analog-to-digital converter (ADC) (not shown) may convert the analog signal from the sensor into a digital signal. The digital signal may then be transmitted to a signal processor for additional processing and display. The sensor and ADC may be implemented together as part of the camera as a single application specific integrated circuit (ASIC).

A pre-processor 305 receives source video 302 from the camera 301 as a sequence of video data and performs pre-processing operations that condition the source video for subsequent coding. Video pre-processing may be performed upon source video data to render video coding more efficient including by performing video processing operations on video frames such as de-noising filtering, bilateral filtering or other kinds of processing operations that improve efficiency of coding operations performed by the encoder.

A coding engine 310 performs coding operations on the processed input signal. The coding engine 310 may exploit temporal and spatial redundancies in the video data to perform motion compensated predictive coding. A decoder 320 decodes the coded video data from the coding engine 310. The decoder 320 may include a reference picture cache 330 to store previously decoded pictures.

A controller 315 sets the integration times for multiple groups of captured pixels. For example, the camera sensor may be configured to capture groups of pixels in a "normal mode" where the same integration time is employed for multiple groups. In normal mode, the read-out value of the group of pixels can be combined for output and the camera 301 may capture a minimal range of the available dynamic range where normal mode has a low dynamic range but a higher signal to noise ratio (SNR) than other modes of capture.

The camera 301 may alternatively be configured in an "HDR mode" by the controller 315. In HDR mode, a first group of pixels is captured at a shorter exposure time (Ts) and a second group of pixels is captured at a longer integration time (Tl).

The camera 301 can be configured to be in "normal mode" or "HDR mode" on a per frame basis.

In general, video quality benefits from such control because the capture of an increased dynamic range usually results in a more realistic image. Based on the conditions of the encoding system 300 and data transmission system as well as the content of the captured image, using different capture modes may limit the entropy of source content. For example, when a low bitrate is required, a high brightness background may be captured with an over-exposed capture mode, thereby decreasing the deterioration of source video during low bitrate encoding.

The switch between capture modes may be adaptive according to the status of the encoding system 300 including, for example, current resolution, scene complexity, frame rate and quantization parameters settings. For example if there is not enough bandwidth to encode the video as HDR, the controller 315 may reduce dynamic range and encode the captured data as low dynamic range video which will lose details in a high brightness area.

The different integration times, Ts and Tl may have certain determined limits. For example, the longer integration time Tl may be obtained by setting the exposure window on a detected object or region of interest, for example, a human face, to ensure that the object is always properly exposed. Additionally, hardware limitations may cause certain predetermined constraints for different integration times Ts and Tl. For example, according to an embodiment, Ts may not be less than Tl/8.

The controller 315 may detect system limitations such as bandwidth via feedback from a channel buffer 340, from the coding engine 310, form the pre-processor 305, or via any other known data rate analysis method.

The encoding system 300 of FIG. 3 provides improved performance over conventional systems that capture HDR video data without reference to the capabilities of the encoder by maintaining a higher quality of encoded video data. Therefore, the visual experience of the viewer is improved.

Figure 4:
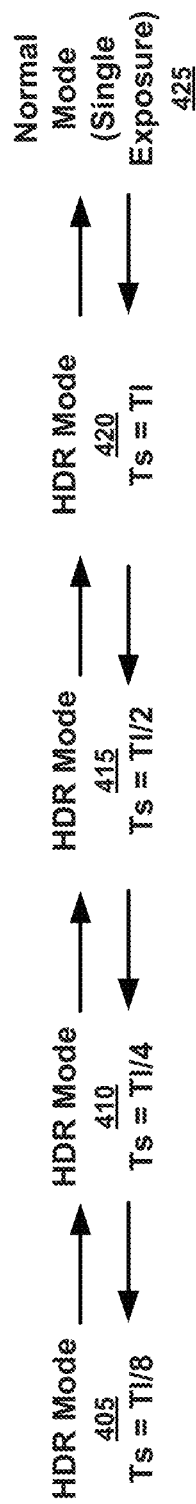
FIG. 4 illustrates an exemplary control scheme for transitioning between camera capture modes.

FIG. 4 illustrates an exemplary control scheme for transitioning between camera capture modes. A transition between camera capture modes may be triggered by a detected image quality level change, for example, which originally may be due to a change in the available bandwidth of an encoding system component. Abrupt changes in integration time, for example when switching between normal mode and HDR capture modes, may result in visible and jarring changes in video quality. Therefore the dynamic range change to be should be gradual. For example, when switching from HDR to normal mode, the difference between Ts and Tl may be reduced gradually before completing the switch to normal mode.

If there is additional available bandwidth, an encoding system may begin a transition from right to left in FIG. 4. If there is a decrease in the available bandwidth, the encoding system may begin a transition from left to right in FIG. 4.

If additional bandwidth is available to switch from normal, single exposure mode 425 to an HDR mode, the controller may first switch the camera capture mode from normal mode 425 to an HDR mode 420 with Ts and Tl being equal, which will be effectively the same as normal mode. Then the difference between Ts and Tl will be gradually increased until the difference in integration time for the camera reaches the desired level of HDR mode.

Ts should be gradually changed to avoid pixel clipping. Therefore each change in Ts should take some time. For example, the transition to each level of Ts or Tl shown in FIG. 4 may be set to take approximately one second per transition or a predetermined number of frames per transition.

Although shown primarily with one full stop between transition states, finer control could also be used depending on the capabilities of the hardware. For example, the steps from HDR mode 420 (Ts=Tl) to HDR mode 405 (Ts=Tl/8) may include additional transitions such as Ts=Tl/3.

Figure 5:
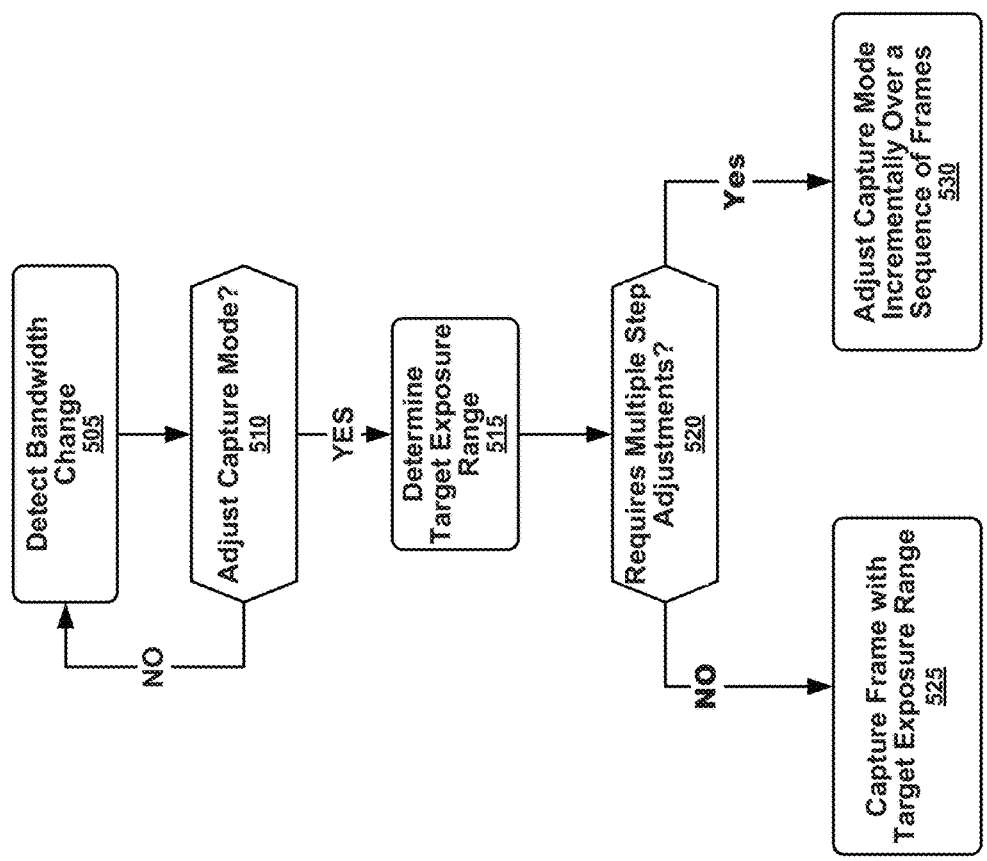
FIG. 5 is a simplified flow diagram illustrating an exemplary method for transitioning between capture modes for an image captured with a camera according to an embodiment of the present invention.

FIG. 5 is a simplified flow diagram illustrating an exemplary method 500 for transitioning between capture modes for an image captured with a camera according to an embodiment of the present invention.

During encoding of received source video data, a controller for the encoder may detect that a change in bandwidth is available or required (block 505).

Based on the change in bandwidth, the controller may determine whether the capture mode for the camera should be adjusted to capture a greater or smaller portion of the dynamic range (block 510). If no change is warranted, the controller will not adjust the exposure time of the camera.

If a change in the exposure time is warranted to adjust the dynamic range being captured by the camera, the controller may determine the desired range between the short exposure time (Ts) and the long exposure time (Tl) applied to different groups of pixels when capturing a frame of video data (block 515).

If the determined target range is close to the current exposure range then a multiple step adjustment is not required (block 520), and the camera may be adjusted to capture the next frame at the target exposure range (block 525). For example, if the camera is capturing video with multiple exposure times at Ts=Tl/4 and it is determined that the target capture range is Ts=Tl/8, the camera may be adjusted to capture the next frame at the target range.

However if the target exposure range is not close to the current exposure range, for example, where the change from current to target exposure ranges is greater than a predetermined threshold and will therefore cause a visual discontinuity, then a multiple step adjustment may be required (block 520).

In a multiple step adjustment, the exposure range of the camera may be adjusted over a predetermined amount of time, or a predetermined number of frames, to gradually adjust the exposure range (block 525). For example, if the camera is in normal mode or HDR mode with Ts=Tl/2 and it is determined that an HDR mode with Ts=Tl/8 is desired, then a controller of the encoder may adjust the capture range for the camera through multiple stages. Exemplary stages are illustrated in FIG. 4.

The techniques described above find application in both hardware- and software-based encoders. In a hardware-based encoder the functional units may be provided in a dedicated circuit system such as a digital signal processor or field programmable logic array or by a general purpose processor. In a software-based encoder, the functional units may be implemented on a personal computer system (commonly, a desktop or laptop computer) executing software routines corresponding to these functional blocks. The program instructions themselves also may be provided in a storage system, such as an electrical, optical or magnetic non-transitory storage medium, and executed by a processor of the computer system. The principles of the present invention find application in hybrid systems of mixed hardware and software designs.

Several embodiments of the present invention are specifically illustrated and described herein. However, it will be appreciated that modifications and variations of the present invention are covered by the above teachings. Other implementations are also within the scope of the present invention.

In other instances, well-known operations, components and circuits have not been described in detail so as not to obscure the embodiments. It can be appreciated that the specific structural and functional details disclosed herein may be representative and do not necessarily limit the scope of the embodiments.

While the invention has been described in detail above with reference to some embodiments, variations within the scope and spirit of the invention will be apparent to those of ordinary skill in the art. Thus, the invention should be considered as limited only by the scope of the appended claims.

We claim:

1. A video coding method, comprising:
receiving a captured image at an encoder;
parsing, with a controller, content of the captured image into at least two groups;
based on a state of the encoder, capturing a new image wherein:
when the encoder has sufficient available bandwidth, the new image includes a first group of pixels contains pixel data captured at a first exposure time and a second group of pixels contains pixel data captured at a second exposure time; and
when the encoder does not have sufficient available bandwidth, all pixels of the new image are captured at a uniform dynamic range; and
with the encoder, coding the new image by video compression.

2. The method of claim 1, wherein the state of the encoder comprises a change in available bandwidth in a component of the encoder.

3. The method of claim 1, wherein said parsing further comprises identifying a high brightness section of the captured image, and creating a group of pixels that includes the identified high brightness section.

4. The method of claim 3, wherein the high brightness group is assigned a longer exposure time than another group of pixels.

5. The method of claim 1, further comprising, prior to coding, combining pixels of the at least two groups using interpolation to smooth transitions between the at least two groups.

6. The method of claim 1, wherein parsing comprises identifying an object in the captured image, and for the new image a group corresponding to the object contains pixels having the highest quality available.

7. The method of claim 1, wherein parsing comprises identifying a region in the captured image, and for the new image, a group corresponding to the region contains pixels of the lowest quality available.

8. The method of claim 1, wherein said parsing comprises identifying an object in the captured image, and separating pixels that comprise the identified object into two groups, wherein combining pixels of the two groups in the new image establishes a high dynamic range for pixels representing the identified object.

9. The method of claim 1, further comprising incrementally adjusting the first exposure time for the group of pixels over a predetermined number of frames based on the state of the encoder.

10. The method of claim 9, wherein the first exposure time is incrementally adjusted when a difference between the first exposure time and the second exposure time is greater than a predetermined threshold.

11. The method of claim 9, wherein the first exposure time is incrementally adjusted when a change from the first exposure time to the second exposure time will cause a visual discontinuity.

12. The method of claim 1, further comprising incrementally adjusting the first exposure time for the first group of pixels over a predetermined period of time based on the state of the encoder.

13. The method of claim 1, further comprising, when the new image is not captured based on the state of the encoder, coding the captured image by video compression.

14. A video coding system, comprising:
a camera to capture an image; and
a controller configured to:
receive the captured image,
parse content of the captured image into at least two groups,
based on a state of the video coding system, capture a new image wherein:
when the controller has sufficient available resources, a first group of pixels in the new image contains pixel data captured at a first exposure time and a second group of pixels in the new image contains pixel data captured at a second exposure time, and
when the controller does not have sufficient available resources, all pixels of the new image are captured at a uniform dynamic range;
code the new image by video compression.

15. The coding system of claim 14, wherein the state of the video coding system comprises a change in available bandwidth in a component of the video coding system.

16. The coding system of claim 14, wherein to parse the content of the captured image into groups, said controller is further configured to identify a high brightness section of the captured image and create a group of pixels that includes the identified high brightness section.

17. The coding system of claim 16, wherein the high brightness group is assigned a longer exposure time than another group of pixels.

18. The coding system of claim 14, wherein said controller is further configured to combine pixels of the at least two groups, prior to coding, using interpolation to smooth transitions between the at least two groups.

19. The coding system of claim 14, wherein to parse the content of the captured image into groups, said controller is further configured to identify an object in the captured image, and separate pixels that comprise the identified object into two groups, wherein combining pixels of the two groups in the new image establishes a high dynamic range for pixels representing the identified object.

20. The coding system of claim 14, wherein to parse the content of the captured image, said controller is further configured to identify an object and for the new image and a group corresponding to the object contains pixels having the highest quality available.

21. The coding system of claim 14, wherein controller is further configured to incrementally adjust the first exposure time for the first group of pixels over a number of frames based on the state of the video coding system.

22. The coding system of claim 21, wherein the first exposure time is incrementally adjusted when a difference between the first exposure time and the second exposure time is greater than a predetermined threshold.

23. The coding system of claim 14, wherein when the video coding system has sufficient available resources, the new image is captured using the first and the second exposure times, and when the video coding system does not have sufficient available resources, the new image is captured at a reduced dynamic range.

24. The coding system of claim 23, wherein the available resources include an available bandwidth at the video coding system.

25. The system of claim 14, wherein, when based on the state of the encoder the new image is not captured, the controller codes the captured image by video compression.

26. A non-transitory computer readable medium storing program instructions that, when executed by a processing device, cause the device to:
upon receiving a captured image at an encoder, parse, with a controller, content of the captured image into at least two groups;
based on a state of the encoder, capture a new image in which:
when the encoder has sufficient available bandwidth, the new image includes a first group of pixels that contains pixel data captured at a first exposure time and a second group of pixels that contains pixel data captured at a second exposure time;
when the encoder does not have sufficient available bandwidth, all pixels of the new image are captured at a uniform dynamic range; and
code the new image by video compression.

27. The non-transitory computer readable medium of claim 26, wherein the state of the encoder comprises a change in available bandwidth in a component of the encoder.

28. The non-transitory computer readable medium of claim 26, wherein said parsing further comprises identifying a high brightness section of the captured image, and creating a group of pixels that includes the identified high brightness section.

29. The non-transitory computer readable medium of claim 28, wherein the high brightness group is assigned a longer exposure time than another group of pixels.

30. The non-transitory computer readable medium of claim 26, further comprising combining pixels of the at least two groups using interpolation to smooth the transitions between the at least two groups.

31. The non-transitory computer readable medium of claim 26, further comprising incrementally adjusting the first exposure time for the first group of pixels over a predetermined number of frames based on the state of the encoder.

32. The non-transitory computer readable medium of claim 31, wherein the first exposure time is incrementally adjusted when a difference between the first exposure time and the second exposure time is greater than a predetermined threshold.

33. The video coding method of claim 26, wherein the available resources include an available bandwidth at the encoder.

34. The non-transitory computer readable medium of claim 26, wherein when the encoder has sufficient available resources, the new image is captured using the first and the second exposure times, and when the encoder does not have sufficient available resources, the new image is captured at a reduced dynamic range.

35. The non-transitory computer readable medium of claim 34, wherein the available resources include an available bandwidth at the encoder.

36. The computer readable medium of claim 26, wherein, when based on the state of the encoder the new image is not captured, program instructions cause the device to code the captured image by video compression.

37. A video coding method, comprising:
capturing images using an exposure control mode;
receiving the captured images at an encoder; and
coding the captured images by video compression, wherein:
when bandwidth available to the encoder exceeds a predetermined level, controlling the exposure control mode to use different exposure times for different groups of pixels during the capturing;
when the bandwidth decreases below the predetermined level, controlling the exposure control mode to use a single exposure time for all pixels during the capturing.

* * * * *